(12) United States Patent
Oh et al.

(10) Patent No.: US 10,916,351 B1
(45) Date of Patent: Feb. 9, 2021

(54) METHOD AND APPARATUS FOR IDENTIFYING THE TYPE OF CYBER-ATTACK AGAINST IOT DEVICES

(71) Applicant: KOREA INTERNET & SECURITY AGENCY, Jeollanam-do (KR)

(72) Inventors: Sung Taek Oh, Jeollanam-do (KR); Woong Go, Jeollanam-do (KR); Hong Geun Kim, Jeollanam-do (KR); Mi Joo Kim, Jeollanam-do (KR); Jae Hyuk Lee, Jeollanam-do (KR); Soon Tai Park, Jeollanam-do (KR)

(73) Assignee: KOREA INTERNET & SECURITY AGENCY, Jeollanam-Do (KR)

( * ) Notice: Subject to any disclaimer, the term of this patent is extended or adjusted under 35 U.S.C. 154(b) by 0 days.

(21) Appl. No.: 16/830,183

(22) Filed: Mar. 25, 2020

(30) Foreign Application Priority Data

Nov. 25, 2019 (KR) ........................ 10-2019-0152464

(51) Int. Cl.
*G06K 9/62* (2006.01)
*G16Y 40/50* (2020.01)
*H04L 29/06* (2006.01)
*G06N 3/04* (2006.01)

(52) U.S. Cl.
CPC .............. *G16Y 40/50* (2020.01); *G06K 9/628* (2013.01); *G06N 3/04* (2013.01); *H04L 63/1416* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 9,582,781 B1* | 2/2017 | Kearns | G06Q 10/0637 |
| 2015/0326450 A1* | 11/2015 | Cruz Mota | H04L 63/1408 709/223 |
| 2016/0028637 A1* | 1/2016 | Vasseur | H04L 47/25 370/235 |
| 2019/0253319 A1* | 8/2019 | Kampanakis | G06N 20/00 |

FOREIGN PATENT DOCUMENTS

| | | |
|---|---|---|
| JP | 2013-038749 A | 2/2013 |
| JP | 2018-067304 A | 4/2018 |
| KR | 10-2010-0001786 A | 6/2008 |
| KR | 10-1703446 B | 6/2017 |
| KR | 10-1897962 B | 10/2018 |
| KR | 10-2019-0087351 | 7/2019 |

OTHER PUBLICATIONS

Mirskey, Yisroel et al., "Kitsune: An Ensemble of Autoencoders for Online Network Intrusion Detection," May 27, 2018, 15 pages.
Notice of Allowance in Korean Patent Application No. KR10-2019-0152464, dated Jul. 10, 2020.

* cited by examiner

Primary Examiner — Brandon S Hoffman
(74) Attorney, Agent, or Firm — Sheppard Mullin Richter & Hampton LLP

(57) ABSTRACT

Provided is a method for classifying a cyber-attack performed in a computing device having an artificial neural network. The method comprises obtaining a plurality of features extracted from collected packets and inputting the plurality of features into the artificial neural network and using data output from the artificial neural network to determine a type of cyber-attack indicated by the collected packet.

20 Claims, 18 Drawing Sheets

FIG. 5

| attack category | attack detail | class |
|---|---|---|
| Reconnaissance | Host Discovery | 1 |
| | Port Scanning | 2 |
| | OS and Service Detection | 3 |
| Man In The Middle (MiTM) | ARP Spoofing Attack | 4 |
| Denial of Service (DoS) | SYN Flooding Attack | 5 |
| | UDP Flooding Attack | 6 |
| | HTTP Flooding Attack | 7 |
| | ACK Flooding Attack | 8 |
| Mirai Botnet – DDoS attack stage | | |
| Mirai Botnet – propagation stage | Scan & Brute-force | 9 |
| normal | | 0 |

FIG. 17

| No. | Feature name | Data type after preprocessing (including normalization) | Is Normalized |
|---|---|---|---|
| 1 | protocol_type | integer (TCP=1, UDP=2, ICMP=3, ARP=4) | N |
| 2 | tl_data_len | float | Y |
| 3-11 | flag | one-hot vector (9 dimensions) | N |
| 12 | tcp_win_size | float | Y |
| 13 | num_of_frags | integer | N |
| 14-16 | arp_op | one-hot vector (3 dimensions) | N |
| 17-23 | icmp_type | one-hot vector (7 dimensions) | N |
| 24-30 | icmp_code | one-hot vector (7 dimensions) | N |
| 31 | same_sip_pkt_cnt | float | Y |
| 32 | same_dip_pkt_cnt | float | Y |
| 33 | same_sip_sport_pkt_cnt | float | Y |
| 34 | same_dip_dport_pkt_cnt | float | Y |
| 35 | same_sip_pkt_dip_cnt | float | Y |
| 36 | same_dip_pkt_sip_cnt | float | Y |
| 37 | same_src_dst_pkt_sport_cnt | float | Y |
| 38 | same_src_dst_pkt_dport_cnt | float | Y |
| 39 | same_sip_src_bytes | float | Y |
| 40 | same_dip_dst_bytes | float | Y |
| 41 | same_sip_icmp_ratio | float | N |
| 42 | same_sip_syn_ratio | float | N |
| 43 | same_dip_icmp_ratio | float | N |
| 44 | same_dip_syn_ratio | float | N |
| 45 | same_sip_syn_ack_diff_cnt | float | Y |
| 46 | same_dip_syn_ack_diff_cnt | float | Y |

METHOD AND APPARATUS FOR IDENTIFYING THE TYPE OF CYBER-ATTACK AGAINST IOT DEVICES

CROSS-REFERENCE TO RELATED APPLICATION

This application claims priority from Korean Patent Application No. 10-2019-0152464 filed on Nov. 25, 2019 in the Korean Intellectual Property Office, and all the benefits accruing therefrom under 35 U.S.C. 119, the contents of which in their entirety are herein incorporated by reference.

BACKGROUND

Technical Field

The presently disclosed concept relates to a method and an apparatus for identifying types of cyber-attack against IoT devices. More specifically, it relates to a method and an apparatus for identifying types of cyber-attack against IoT devices, in which it receives a feature set extracted from collected packets and utilizes an artificial neural network to determine types of cyber-attack depending on the collected packets.

Description of the Related Art

Cyber security countermeasures based on machine learning technology are provided. For example, it is known that in order to detect known malicious code, supervised learning of an artificial neural network is performed using training data related to the malicious code, and thus, inter-node weights of the artificial neural network are updated to detect the malicious code.

In addition, a machine learning-based technology for perceiving attack/normal status to detect patterns depending on cyber-attacks is known.

However, conventional technologies may detect malicious codes and detect the presence of an attack, but not a type or category of attack. Security officers have difficulty in establishing security measures simply by knowing whether there is an attack on traffics. In other words, since the characteristics and targets of each attack category are different, the category of attack may be identified and the appropriate damage mitigation measures may be applied. Nevertheless, based on a cyber-attack occurring, the security officers cannot quickly figure out what type of attack it is. Therefore, while the time to figure out a type of attack takes place, the problem will be more spread and serious.

Meanwhile, many IoT (Internet Of Things) devices have recently been connected to the Internet. Most IoT devices are embedded systems that perform operations, but many of them have their own security vulnerabilities. Cyber-attacks aiming at these security vulnerabilities are increasing. If the cyber-attack occurs on the IoT device, the damage is severe. Therefore, it is important to quickly figure out the type of cyber-attack against the IoT devices. However, due to the problems mentioned above, even if there is the cyber-attack against the IoT devices, it is difficult for the security officer to quickly take appropriate follow-up actions depending on the type of cyber-attack.

SUMMARY

Aspects of the presently disclosed concept provides a method for identifying a type of cyber-attack by analyzing packets transmitted and received by one or more target devices, and an apparatus or system to which the method may be applied.

Aspects of the presently disclosed concept also provides a method for increasing the accuracy of an artificial neural network while minimizing the time and cost for tagging each learning data by training the artificial neural network that output a value that indicates a type of cyber-attack in a machine-learning manner based on unsupervised learning, and an apparatus or system to which the method may be applied.

Aspects of the presently disclosed concept also provides a method that identifies a type of cyber-attack that targets IoT devices by analyzing packets transmitted and received by one or more target IoT devices, and an apparatus or system to which the method may be applied.

Aspects of the presently disclosed concept also provides a method for training an artificial neural network using a feature set of optimized configuration for identifying a type of cyber-attack targeting IoT devices, and an apparatus or system to which the method may be applied.

The aspects of the presently disclosed concept may not be restricted to those set forth herein. The above and other aspects of the presently disclosed concept will become more apparent to one of ordinary skill in the art to which the presently disclosed concept pertains by referencing the detailed description of the presently disclosed concept given below.

According to the present disclosure, a method for classifying a cyber-attack performed in a computing device having an artificial neural network may be provided. The method comprises obtaining a plurality of features extracted from collected packets, and inputting the plurality of features into the artificial neural network and using data output from the artificial neural network to determine a type of cyber-attack indicated by the collected packets, wherein the artificial neural network comprises an input layer with a first dimension, an encoder layer with a second dimension smaller than the first dimension to receive a first output value from the input layer, a representation layer with a third dimension smaller than the second dimension to receive a second output value from the encoder layer, and a classifier layer to directly receive a third output value from the representation layer and to output a probability for each class, and wherein the plurality of features comprise a count of destination IPs of packets transmitted from the same source IP during a reference time, a count of source IPs of packets transmitted to the same destination IP during the reference time, a count of source ports of packets with the same source IP and the same destination IP during the reference time, and a count of destination ports of packets with the same source IP and the same destination IP during the reference time.

According to the present disclosure, an apparatus for classifying a cyber-attack may be provided. The apparatus comprises a feature extractor for extracting a plurality of features from collected packets, an artificial neural network including an input layer with a first dimension, an encoder layer with a second dimension smaller than the first dimension to receive a first output value from the input layer, a representation layer with a third dimension smaller than the second dimension to receive a second output value from the encoder layer, and a classifier layer to directly receive a third output value from the representation layer and to output a probability for each class, and a cyber-attack classification unit for inputting the plurality of features into the artificial neural network and for using data output from the artificial neural network to determine a type of cyber-attack indicated by the collected packets, and wherein the plurality of features further comprise a count of destination IPs of packets transmitted from the same source IP during a reference time, a count of source IPs of packets transmitted to the same destination IP during the reference time, a count of source ports of packets with the same source IP and the same destination IP during the reference time, and a count of destination ports of packets with the same source IP and the same destination IP during the reference time.

According to the present disclosure, a method for training a model to classify a cyber-attack against an IoT device performed in a computing device may be provided. The method comprises obtaining a plurality of features extracted from collected packets, inputting a learning data set comprising the plurality of features into an auto encoder artificial neural network and training the auto encoder artificial neural network in unsupervised learning, constructing an artificial neural network for attack classification including an input layer, an encoder layer, and a representation layer of the learned auto encoder artificial neural network, and further including a classifier layer that directly receives an output value from the representation layer and outputs a probability for each class, and training the artificial neural network for attack classification by supervised learning, wherein the input layer has a first dimension, the encoder layer has a second dimension smaller than the first dimension, and the representation layer has a third dimension smaller than the second dimension.

BRIEF DESCRIPTION OF THE DRAWINGS

The above and other aspects and features of the presently disclosed technology will become more apparent by describing in detail exemplary embodiments thereof with reference to the attached drawings, in which:

FIG. 5 is a diagram illustrating a type of cyber-attack classified in some embodiments of the presently disclosed concept;

FIG. 17 is a diagram for explaining a feature set input to an artificial neural network in some embodiments of the presently disclosed concept.

DETAILED DESCRIPTION OF THE EMBODIMENTS

Hereinafter, embodiments of the present disclosure will be described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments may be provided so that this disclosure will be thorough and complete and will fully convey the concept of the disclosure to those skilled in the art, and the present disclosure will be defined by the appended claims.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein may be for the purpose of describing embodiments and may not be intended to be limiting of the presently disclosed technology. In this specification, the singular also includes the plural unless specifically stated otherwise in the phrase.

A system for detecting a cyber-attack according to an embodiment of the presently disclosed concept is described with reference to FIGS. 1 to 4. FIGS. 1 to 4 are different configuration diagrams of the system for detecting the cyber-attack according to the present embodiment.

Figure 1:
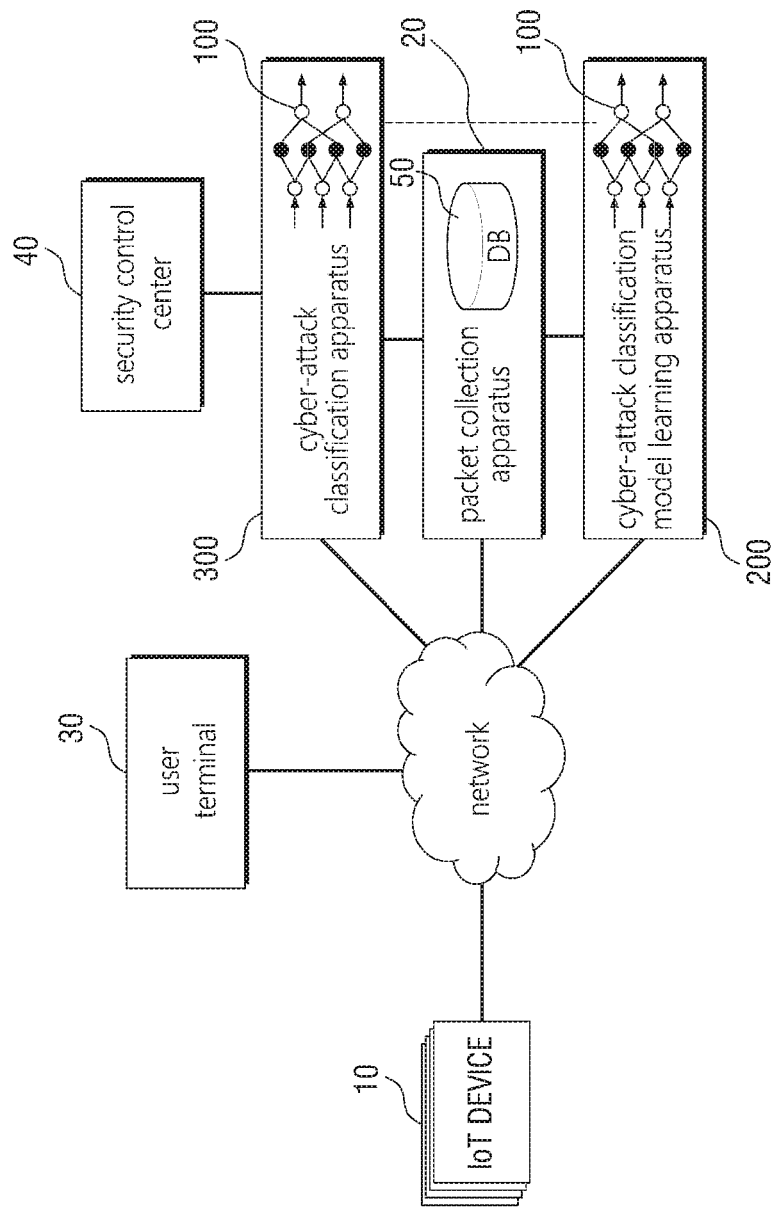
FIGS. 1 to 4 are schematic diagrams of a system for detecting a cyber-attack that may be constructed according to an embodiment of the presently disclosed concept.

First, a description will be given with reference to FIG. 1. As shown in FIG. 1, the system for detecting the cyber-attack according to the present embodiment may include a cyber-attack classification apparatus, a packet collection apparatus 20, and a cyber-attack classification model learning apparatus 200.

The packet collection apparatus 20 collects packets transmitted and received by IoT devices 10. The packet collection apparatus 20 shown in FIG. 1 may be connected to a core network of a network to collect the packets. The packet collection apparatus 20 may store the collected packets in a database 50. As shown in FIG. 1, the database 50 may be located outside the packet collection apparatus 20.

The packet collection apparatus 20 may periodically transmit the collected packet set to the cyber-attack classification apparatus 300. Alternatively, in response to a request of the cyber-attack classification apparatus 300, the packet collection apparatus 20 may transmit the packet set. The cyber-attack classification apparatus 300 may form a plurality of features including features extracted from the packet set (basic features) and features indicating a trend during a reference time (time-based features), input the plurality of features into an artificial neural network, and use a value output from the artificial neural network to determine a type of cyber-attack indicated by the collected packets.

Herein, an artificial neural network that receives a feature set including a plurality of predetermined features and outputs a value indicating a type of cyber-attack may be referred to as an artificial neural network for attack classification.

In addition to an input layer or a representation layer among neural network architectures of the well-known auto encoder structure, the artificial neural network for attack classification has a structure in which a classifier layer that receives a value output from the representation layer and outputs a probability for each class may be connected. In other words, it may be understood that the artificial neural network for attack classification may be connected directly to a classifier instead of a decoder in the auto encoder. An output layer may be further connected subsequent to the classifier. The classifier layer may use a softmax function as an activation function. Various architectures of the artificial neural network for attack classification according to some embodiments of the presently disclosed concept will be described below with reference to FIGS. 8 to 15.

Here, the plurality of features may include a count of destination IPs of packets transmitted from the same source IP during the reference time, a count of source IPs of packets transmitted to the same destination IP during the reference time, a count of source ports of packets with the same source IP and the same destination IP during the reference time, and a count of destination ports of packets with the same source IP and the same destination IP during the reference time.

Further, as an example, the plurality of features may include at least some of a count of destination IPs of packets transmitted from the same source IP during the reference time, a count of source IPs of packets transmitted to the same destination IP during the reference time, a count of source ports of packets having the same source IP and the same destination IP during the reference time, a count of destination ports of packets with the same source IP and the same destination IP during the reference time, a count of packets transmitted from the same source IP during the reference time, a count of packets transmitted to the same destination IP during the reference time, a count of packets transmitted on the same source port of the same source IP during the reference time, a count of packets transmitted on the same destination port of the same destination IP during the reference time, a count of packets transmitted on the same source port of the same source IP during the reference time, a count of fragmented packets, a TCP window size that may be set based on a packet indicated by the plurality of features being a TCP protocol packet, a data length that may be set based on a packet indicated by the plurality of features corresponding to a transport layer, a data size transmitted from the same source IP during the reference time, a data size transmitted to the same destination IP during the reference time, a proportion of SYN packets with a SYN flag of the TCP protocol being set, a difference value between a count of the SYN packet and a count of the ACK packet thereof, an ICMP type, an ICMP code, a proportion of ICMP packets from the same source IP during the reference time, a proportion of ICMP packets from the same destination IP during the reference time, and an OP (Opcode) value of an ARP packet. The plurality of features will be described later in detail with reference to FIG. 17.

In addition, the packet collection apparatus 20 may transmit bulk data of the collected packets to the cyber-attack classification model learning apparatus 200. The cyber-attack classification model learning apparatus 200 trains the artificial neural network for attack classification through machine learning. The cyber-attack classification model learning apparatus 200 inputs learning data set including the plurality of features into an auto encoder artificial neural network to train the auto encoder artificial neural network by unsupervised learning; configures an artificial neural network for attack classification including an input layer, an encoder layer, a representation layer of the learned auto encoder artificial neural network and further including a classifier layer to receive a value output from the representation layer and to output a probability for each class; and then trains the artificial neural network for attack classification by supervised learning. Machine learning for the artificial neural network for attack classification will be described later in detail with reference to FIGS. 6 to 8.

The packet collection apparatus 20 may train the artificial neural network for attack classification so that the artificial neural network for attack classification outputs an output value indicating any one of a total of 10 classes. This will be described with reference to FIG. 5. The 10 classes 63 include one class indicating normal and 9 classes indicating nine different types of attacks. 9 attack types 62 may be classified into 5 attack categories 61. The 9 attack types described below may be those that may cause substantial problems among attacks on the IoT devices, and include those identifiable through a feature of a packet. By determining as a normal packet based on it not being one of the 9 attack types described below, it may effectively classify attacks on the IoT devices.

Although the effective classification of attacks on the IoT devices may be described, naturally, embodiments of the presently disclosed concept may also be applied to classify attacks over networks against various electronic devices as well as the IoT devices. The 9 attack types 62 may be described below.

Attack Category 61 Reconnaissance type includes 3 attack types 62. A Host Discovery attack may be an attack to find a host that is running to identify an attack target host on a network by using nmap. A Port Scanning attack may be a preliminary attack to check vulnerabilities before intrusion against the target host, and is an attack to check which ports may be open. An OS and Service Detection attack may be an attack to check information on an operating system (OS) type, a version, and a running service of the target host.

Attack Category 61 Man In The Middle (MITM) type includes 1 attack type 62. An ARP Spoofing attack may be an attack in which a packet is transmitted from a victim past a gateway through an attacker's PC, by using a loophole in the Address Resolution Protocol (ARP) protocol, which is used to determine a MAC address of a device based on IP addresses of devices on a network.

Attack Category 61 Denial of Service (DoS) type includes 1 attack type 62. A SYN Flooding Attack attack may be an attack in which it sends a large amount of TCP SYN packets to a target host, depleting the target's resources so that a target device cannot accept any further connection requests.

Attack Category 61 Mirai Botnet-DDoS attack stage type includes 3 attack types 62. An HTTP Flooding attack may be a method for attacking a web server or application using an HTTP GET/POST request packet that looks normal. A UDP Flooding attack may be a method for generating a large amount of UDP packets to attack random ports. The ACK Flooding attack may be an attack that generates a large amount of TCP ACK packets to prevent other clients from responding.

Attack Category 61 Mirai Botnet-propagation stage type includes 1 attack type 62. A Scan & Brute-force attack may be an attack in which after IoT devices infected by Mirai malware attempt to invade other devices in the order of peripheral device scan (using ARP protocol), telnet port scan, and access information brute-force, the device downloads malware from a Command & Control (C & C) server based on it succeeding.

The cyber-attack classification model learning apparatus 200 directly transmits data defining the learned artificial neural network for attack classification 100 to the cyber-attack classification apparatus 300, or transmits them through an artificial neural network deployment management apparatus. The cyber-attack classification apparatus 300 may classify a cyber-attack generated against the IoT device into any one of the 9 types described above using the artificial neural network for attack classification 100, and then may transmit information on the identified attack type to a security control center 40. Naturally, Information on the identified attack type may be transmitted to a user terminal 30 by a request of the user terminal 30.

Figure 2:
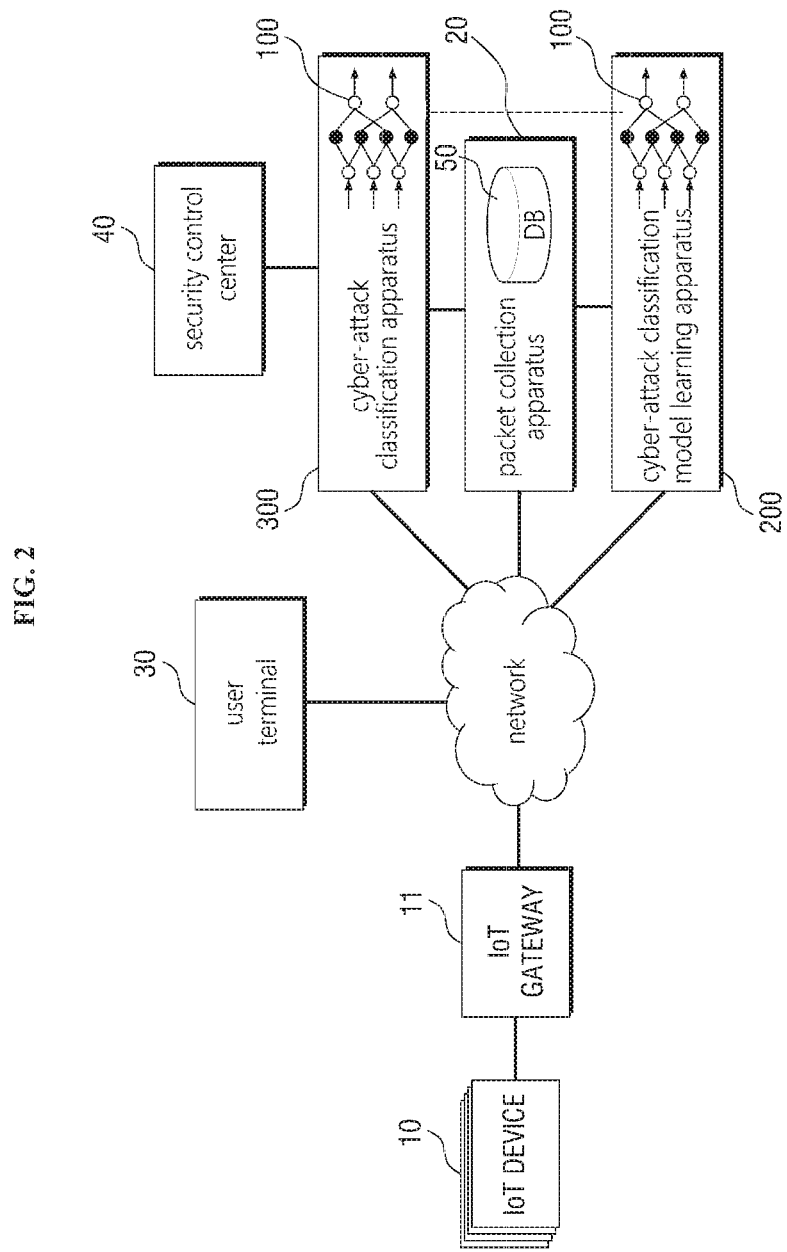

According to the present embodiment, a system having a configuration different from that described with reference to FIG. 1 may also be formed. For example, as shown in FIG. 2, a packet determined as abnormal by an IoT gateway 11 in which an abnormal packet detection module (not shown) may be embedded may be transmitted to the packet collection apparatus 20, thereby preventing a proportion of normal packets in learning data from becoming too high and a machine learning time from increasing. The IoT gateway 11 may be an apparatus for monitoring all transmission and reception packets of one or more monitored IoT devices, and it may be understood as a computing device having a certain level of computational power. For example, the IoT gateway 11 may be an AI speaker, an edge device, a wall pad, or the like.

Figure 3:
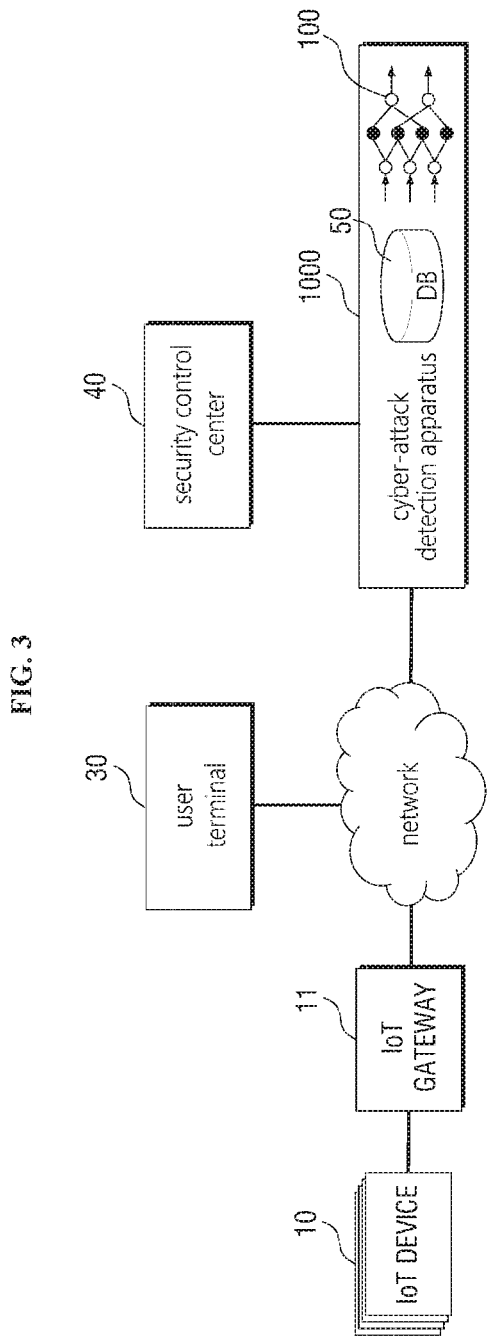

In addition, as shown in FIG. 3, a cyber-attack detection apparatus 1000 may be provided in which all the functions of the cyber-attack classification apparatus, the packet collection apparatus, and the cyber-attack classification model learning apparatus may be integrated.

Figure 4:
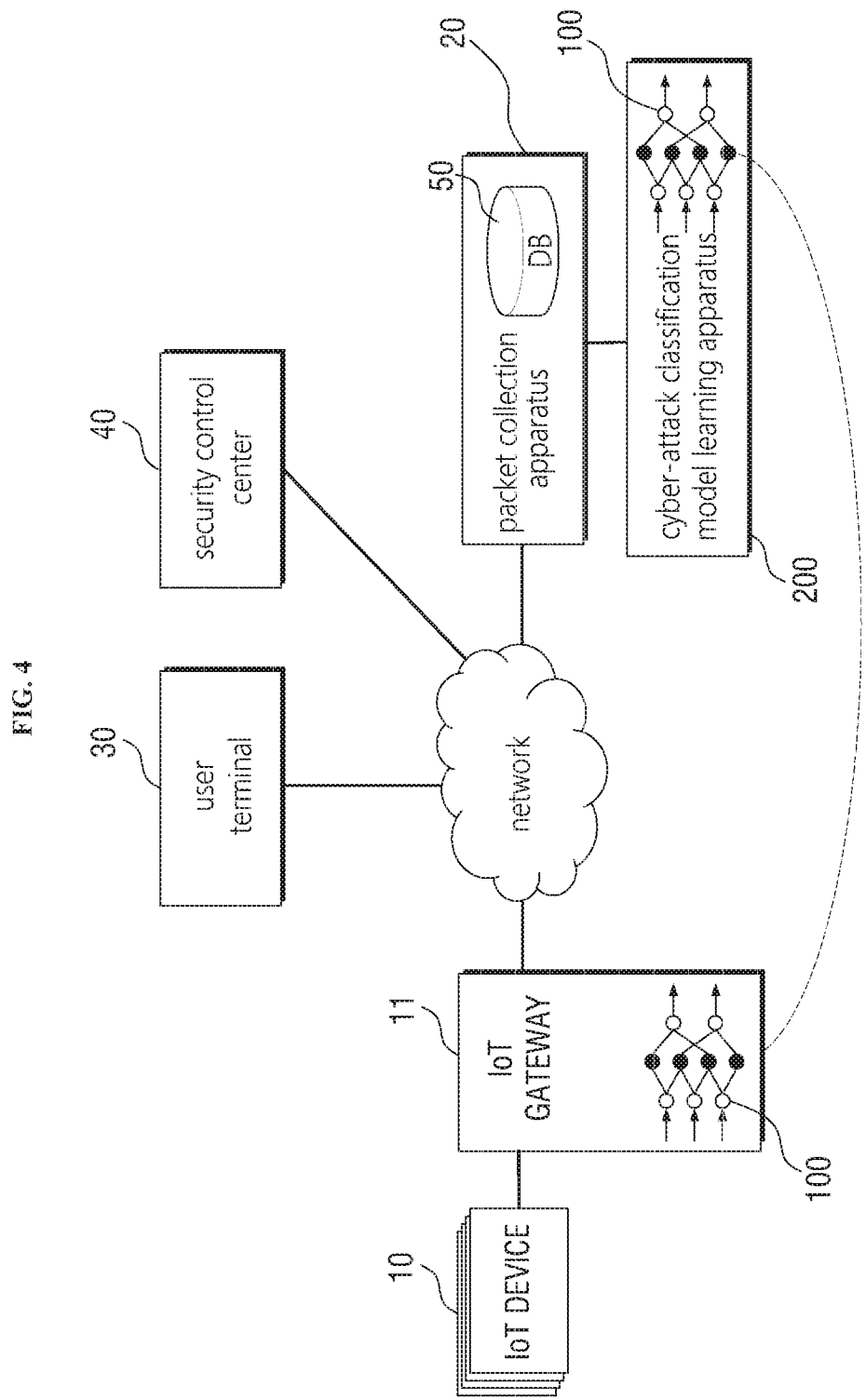

In addition, as shown in FIG. 4, the IoT gateway 11 may also serve as a cyber-attack classification apparatus. Here, the cyber-attack classification model learning apparatus 200 may distribute the learned artificial neural network for attack classification 100 to the IoT gateway 11 periodically or aperiodically depending on its update situation. Here, the IoT gateway 11 may collect at least some packets of all IoT devices that the IoT gateway 11 may be responsible for, form a plurality of features including basic features extracted from the collected packets and time-based features indicating trends over a reference time, input the plurality of features into an artificial neural network, and use a value output from the artificial neural network to determine a type of cyber-attack to which the collected packet indicates. The IoT gateway 11 may transmit the type of cyber-attack and its related information to the security control center 40. Naturally, the IoT gateway 11 may transmit the type of cyber-attack and its related information to the user terminal 30 in response to a request of the user terminal 30.

Figure 6:
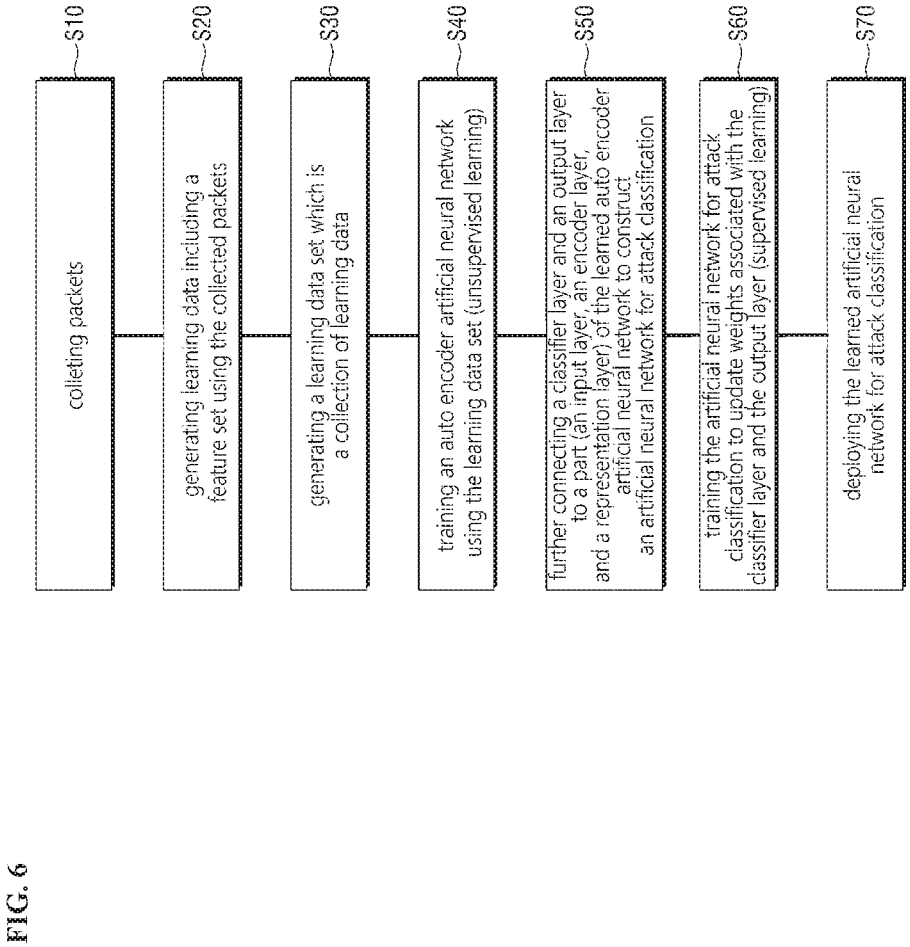
FIG. 6 is a flowchart of a method for training an artificial neural network for attack classification according to another embodiment of the presently disclosed concept.
Figure 7:
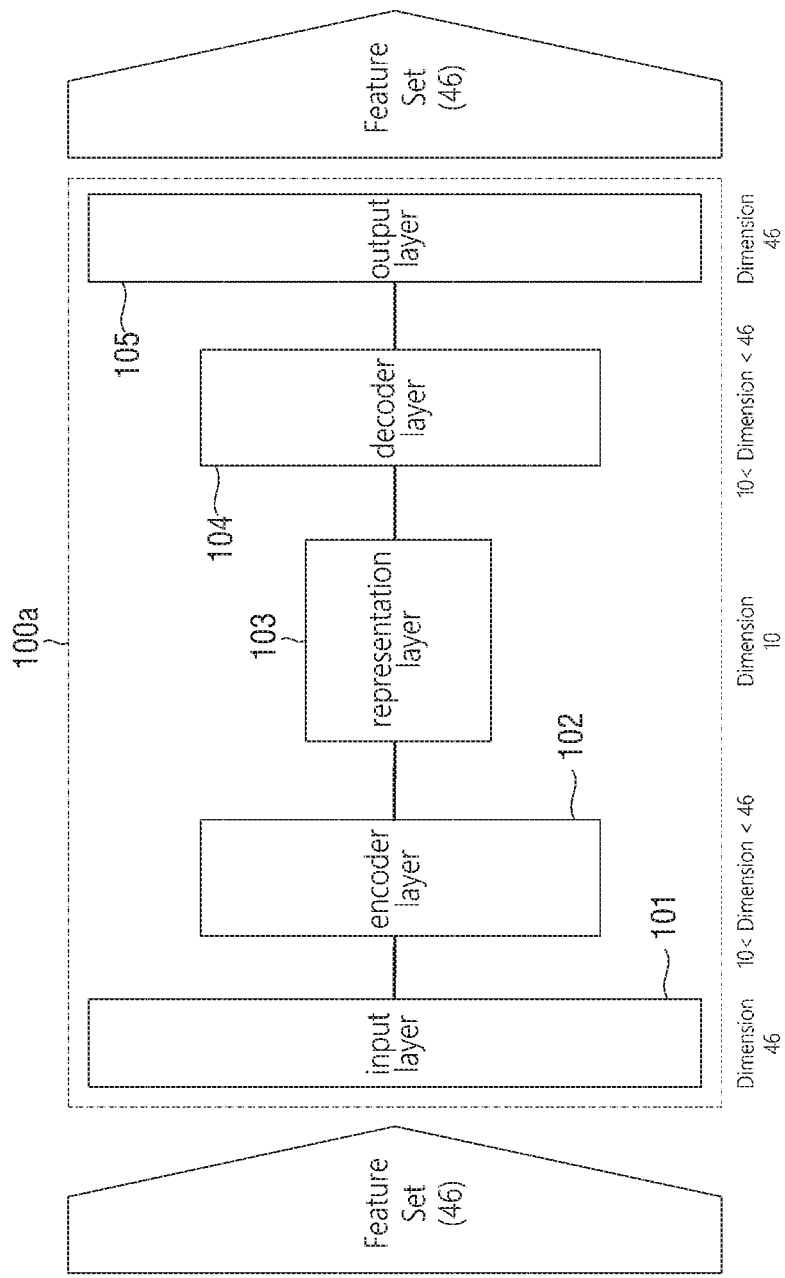
FIG. 7 is a diagram for explaining a first structure of an auto encoder.

Hereinafter, a method for learning a cyber-attack classification model according to another embodiment of the presently disclosed concept will be described with reference to FIGS. 6 to 8. FIG. 6 is a flowchart according to the present embodiment. The method according to the present embodiment may be performed by a computing device. The computing device may be, for example, the cyber-attack classification model learning apparatus shown in FIGS. 1 to 2.

Based on packets being collected (S10), learning data including a feature set may be generated using the collected packets (S20). Each feature included in the feature set will be described later in detail with reference to FIG. 17. Next, a learning data set in which each learning data may be collected is generated (S30).

An auto encoder artificial neural network may be trained using the learning data set. An artificial neural network architecture 100a with an auto encoder structure is shown in FIG. 7. The artificial neural network of FIG. 7 performs an encoding process of compressively expressing 46 features into 10 features and a decoding process of restoring the 10 features back to the 46 features. An input to an input layer 101 and an output from an output layer 105 may be the same. There may be no need for additional tagging of a feature set for learning of the auto encoder artificial neural network. In other words, the learning of the auto encoder artificial neural network may be unsupervised learning.

It will be described with reference to FIG. 6 back again. In step S50, a classifier layer and an output layer may be further connected to an input layer, an encoder layer, and a representation layer of the learned auto encoder artificial neural network to configure an artificial neural network for attack classification. In step S60, the artificial neural network for attack classification may be trained by inputting learning data including a 46 features set into the artificial neural network for attack classification. In the learning process, an internal weight of the artificial neural network for attack classification will be updated through error back-propagation. Here, an error between an attack type depending on a value output from the artificial neural network for attack classification and an actual attack type will be determined. In other words, the learning process of the artificial neural network for attack classification may be supervised learning in which an attack type should be tagged to each learning data.

In some embodiments, the error back-propagation may be performed up to a weight between the representation layer and the classifier layer. In this case, a weight between the input layer, the encoder layer, and the representation layer learned in the unsupervised learning process for the auto encoder artificial neural network may be prevented from being contaminated by the error back-propagation due to the supervised learning. Naturally, in some other embodiments, the error back-propagation may be performed by a weight between the input layer and the encoder layer, so that additional learning by the supervised learning may be reflected.

The classifier layer may be a fully-connected layer with the representation layer. The classifier layer may use any one of various activation functions such as a sigmoid function, a ReLU (Rectified Linear Unit) function, a STEP function, or the like.

In some embodiments, the classifier layer may use a softmax function. In this case, this may help the output layer to output a class value more accurately.

Figure 8:
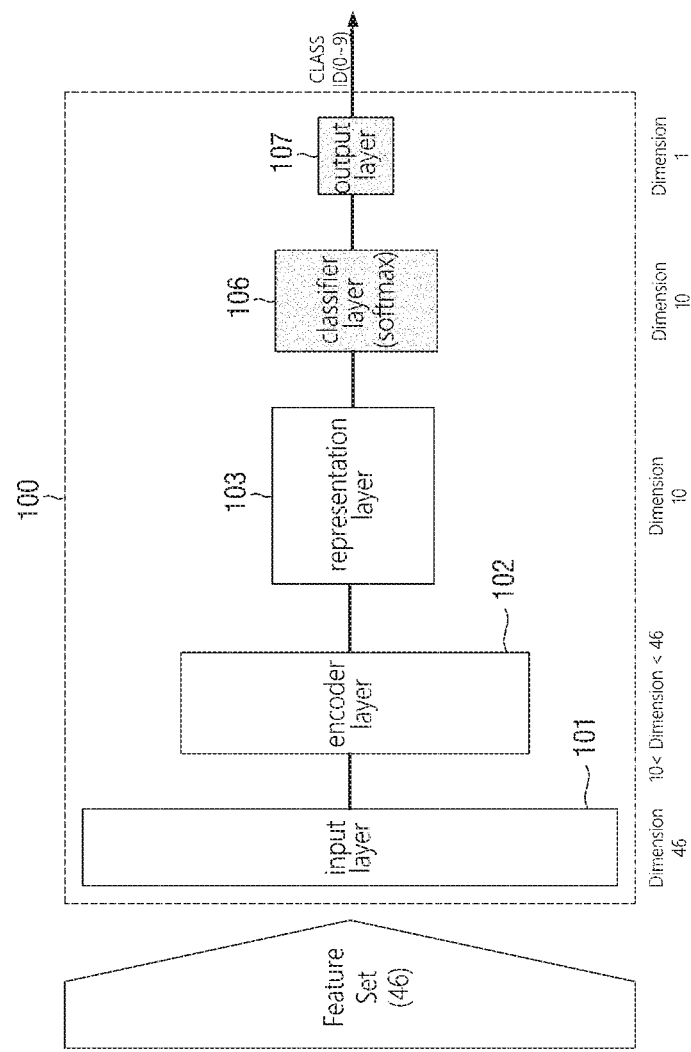
FIG. 8 is an artificial neural network to classify an attack, in which the artificial neural network is trained according to the method for training the artificial neural network for attack classification described with reference to FIG. 6, and it is a first example of architecture based on a part of the auto encoder shown in FIG. 7.
Figure 9:
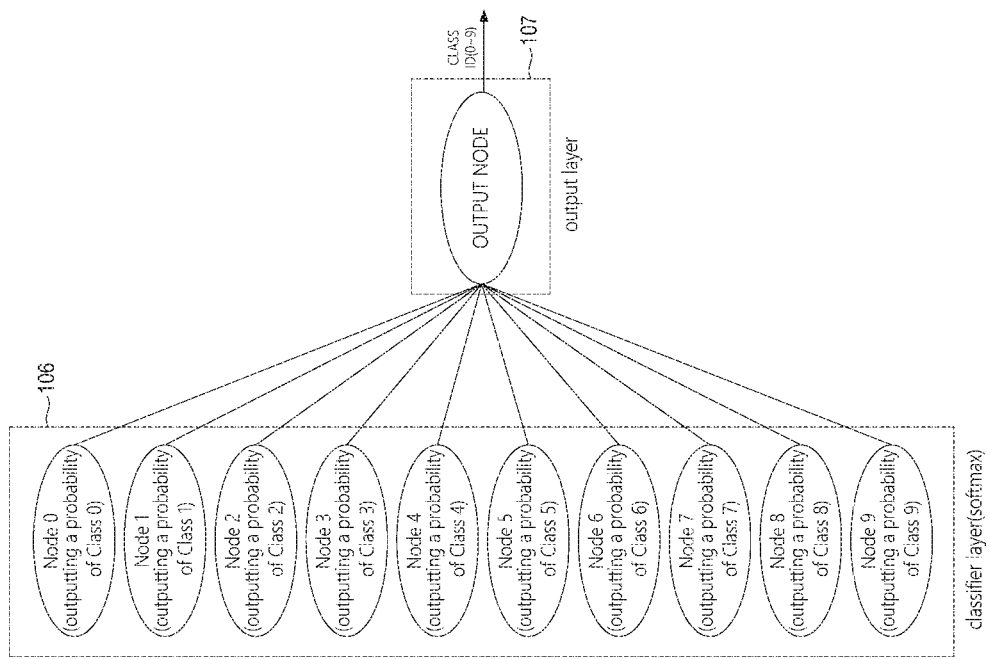
FIG. 9 is an enlarged diagram of a part of the architecture of the artificial neural network for attack classification of FIG. 8.

FIG. 8 shows an example of an architecture of the artificial neural network for attack classification. As shown in FIG. 8, a dimension of the classifier layer may be equal to 10, a count of classes. In this case, as shown in FIG. 9, each node of a classifier layer 106 outputs a probability to correspond to each class. As already explained, based on the softmax function being applied to the classifier layer 106, the sum of the probabilities to correspond to each class output by each node of the classifier layer 106 will be 1.

Figure 10:
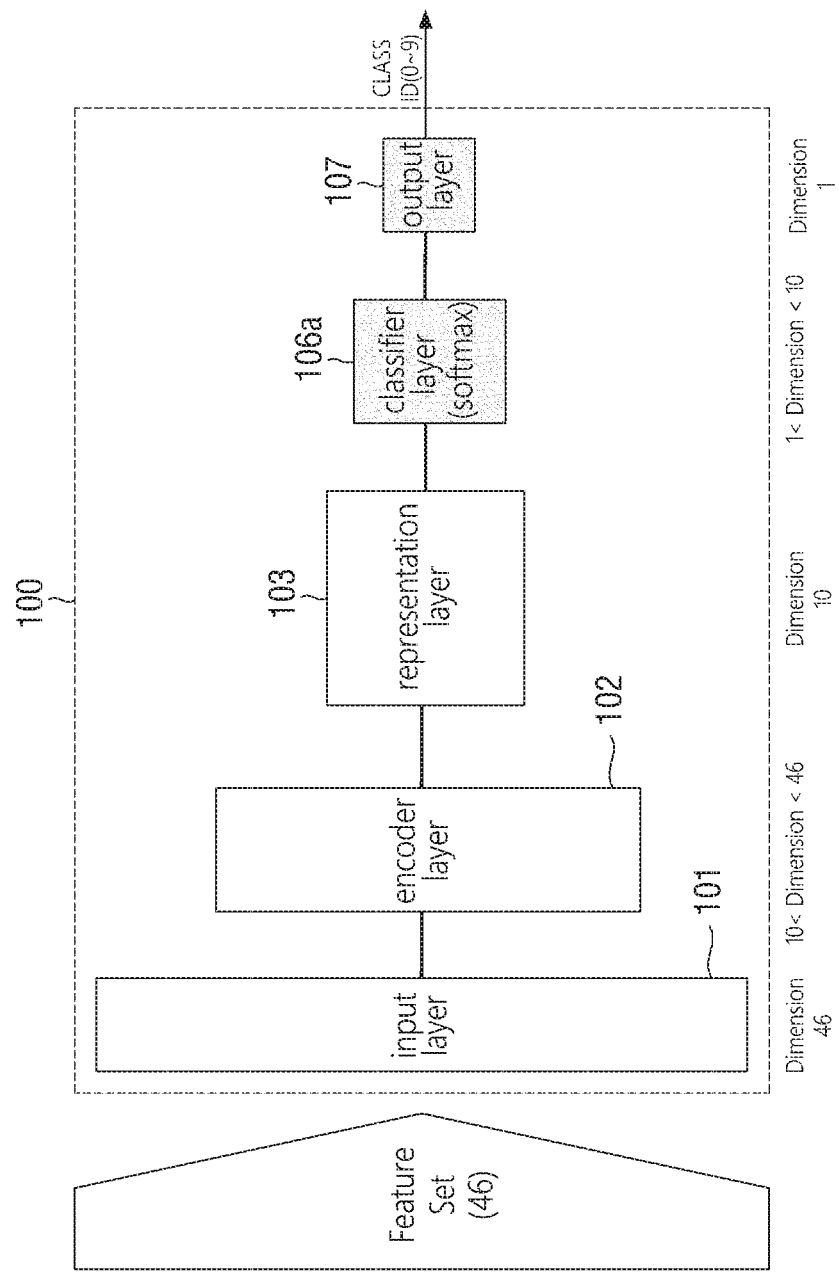
FIG. 10 is a second example of architecture of the artificial neural network for attack classification trained according to the method for training the artificial neural network for attack classification described with reference to FIG. 6.
Figure 11:
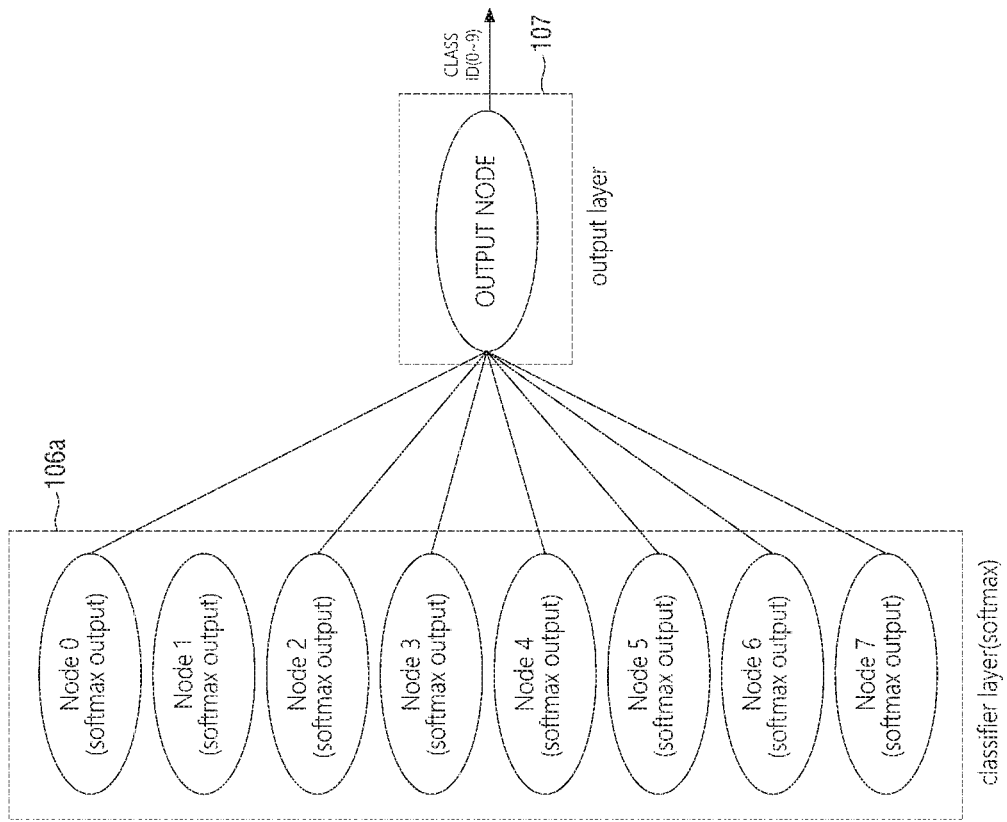
FIG. 11 is an enlarged diagram of a part of the architecture of the artificial neural network for attack classification of FIG. 10.

Further, according to some embodiments, a dimension of a classifier layer 106a may be less than 10, a count of classes, as shown in FIGS. 10 and 11. In this case, the total number of weights to be learned may be reduced, so that a learning speed of the artificial neural network for attack classification may be increased.

Figure 12:
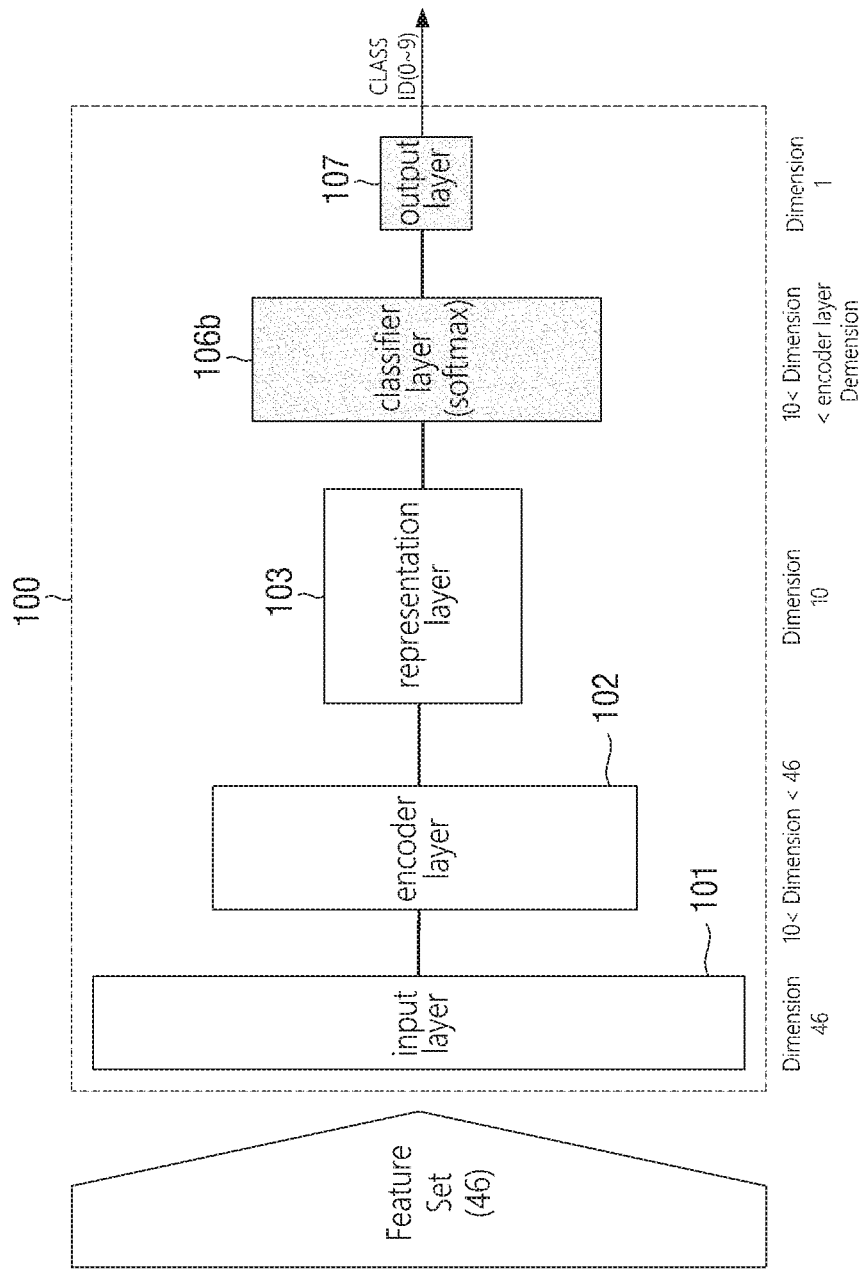
FIG. 12 is a third example of architecture of the artificial neural network for attack classification trained according to the method for training the artificial neural network for attack classification described with reference to FIG. 6.
Figure 13:
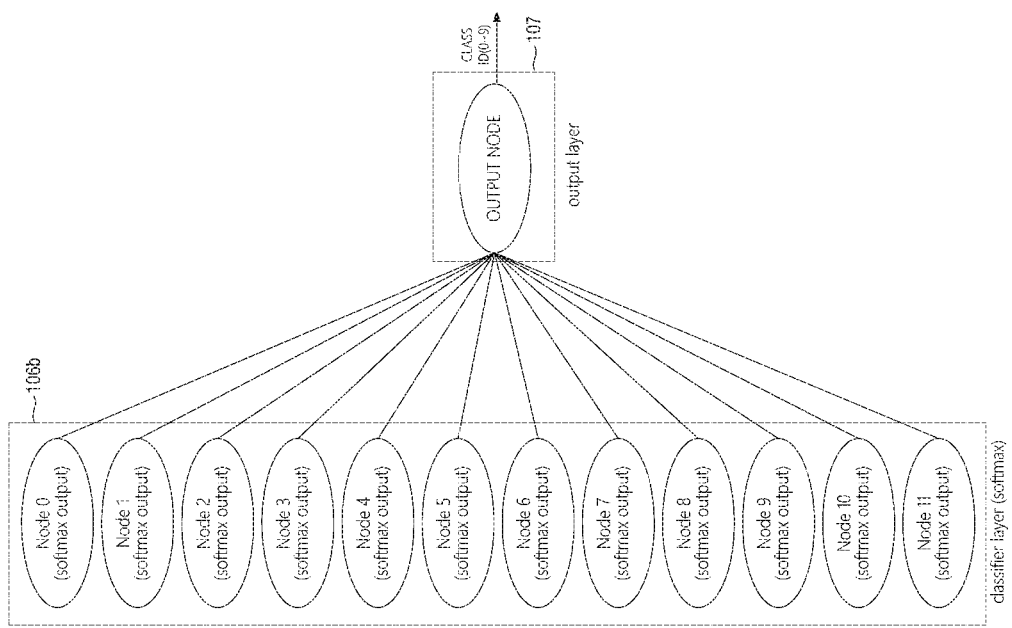
FIG. 13 is an enlarged diagram of a part of the architecture of the artificial neural network for attack classification of FIG. 12.

Further, according to some other embodiments, a dimension of a classifier layer 106b may exceed 10, a count of classes, as shown in FIGS. 12 and 13. In this case, the total number of weights to be learned increases, so that the learning speed of the artificial neural network for attack classification may be somewhat slowed, but the accuracy of the classifier may be expected to increase.

Figure 14:
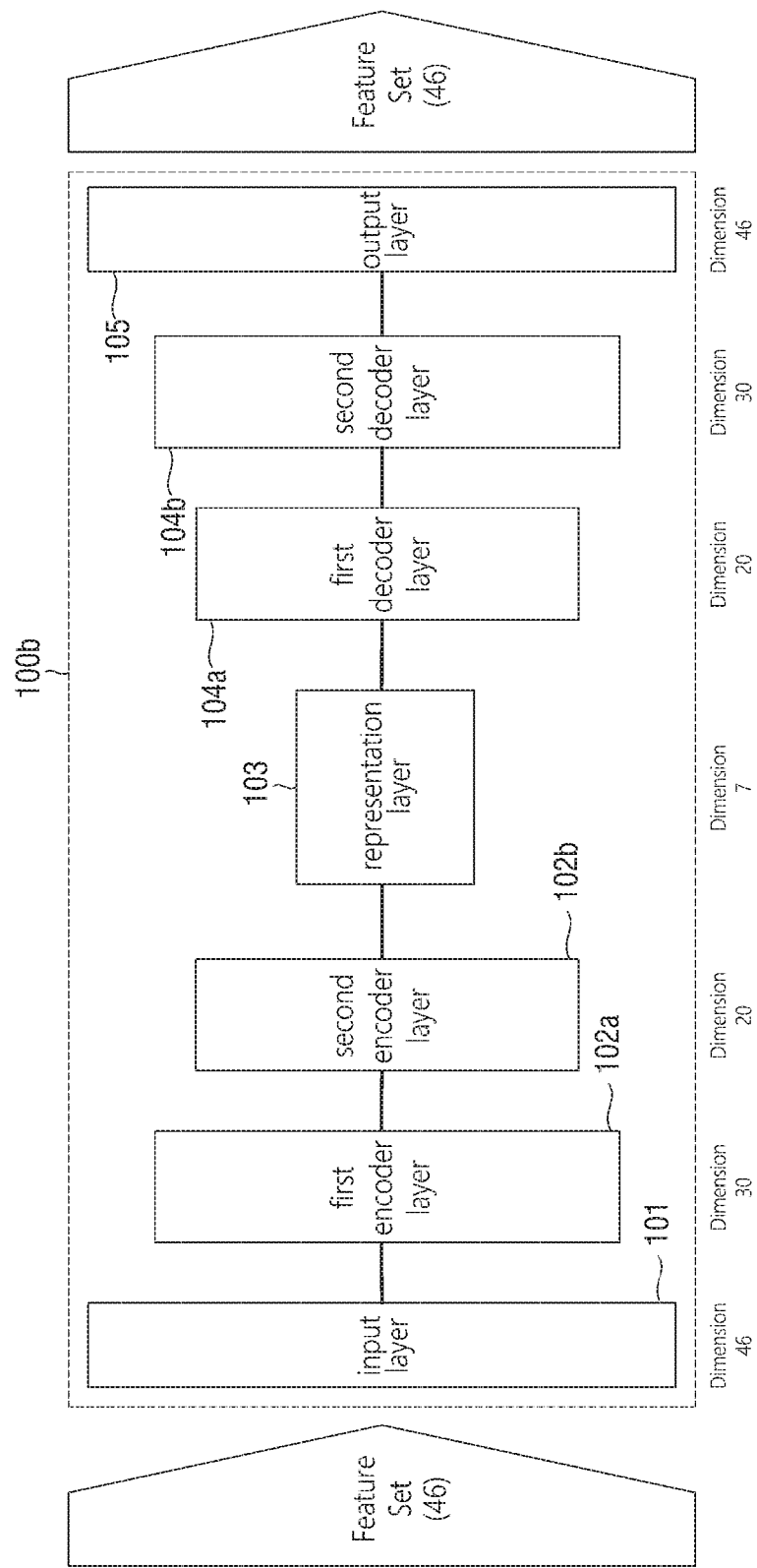
FIG. 14 is a diagram for explaining a second structure of an auto encoder.
Figure 15:
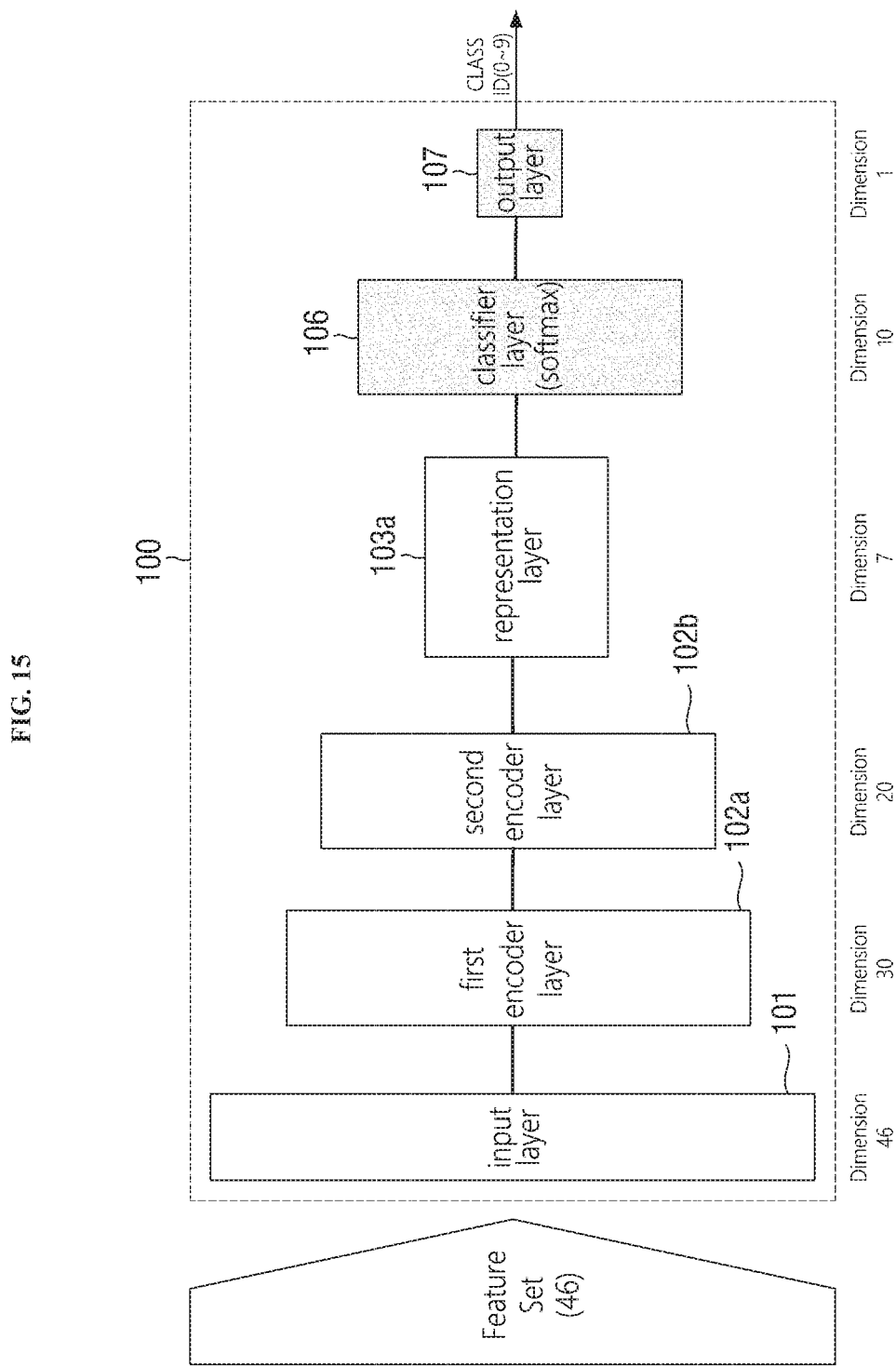
FIG. 15 is an artificial neural network to classify an attack, in which the artificial neural network is trained according to the method for training the artificial neural network for attack classification described with reference to FIG. 6, and it is a fourth example of architecture based on a part of the auto encoder shown in FIG. 14.

The architecture of the artificial neural network for attack classification described with reference to FIGS. 8 to 13 assumes that a dimension of the representation layer of the auto encoder may be 10, a count of classes. According to some other embodiments of the presently disclosed concept, the dimension reduction through the auto encoder may be further enhanced to set the dimension of the representation layer to be smaller than 10, a count of classes. In this case, as shown in FIG. 14, it may be possible to train an auto encoder artificial neural network 100b including a plurality of encoder layers 102a and 102b and a plurality of decoder layers 104a and 104b, and to configure an artificial neural network for attack classification including the plurality of encoder layers 102a and 102b and a representation layer 103a having a dimension of less than 10. In this case, a result of removing more noise among information of up to 46 features set will be output from the representation layer. The classifier layer 106 may have the effect of outputting a more accurate predicted probability for each class.

So far, with reference to FIGS. 8 to 15, the architectures of the artificial neural network for attack classifications according to some embodiments have been described.

According to some other embodiments of the presently disclosed concept, a hyper parameter capable of defining the architecture may be determined through hyper-parameter optimization. The hyper parameter may include, for example, at least some of a count of the encoder layers of the auto encoder, the dimension of each encoder layer, the dimension of the representation layer, and the dimension of the classifier layer.

Figure 16:
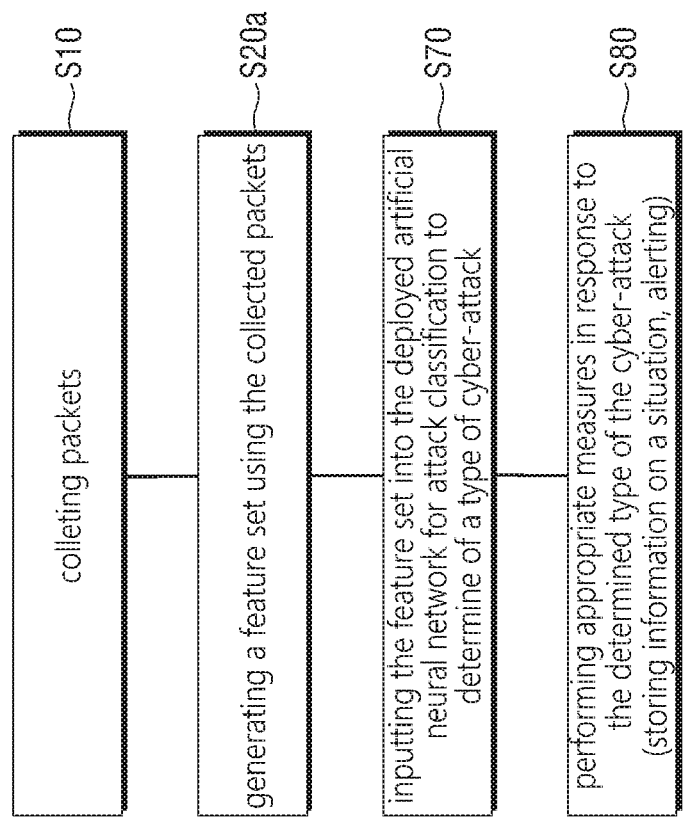
FIG. 16 is a flowchart of a method for classify a cyber-attack according to another embodiment of the presently disclosed concept.

Next, a method for classifying a cyber-attack according to another embodiment of the presently disclosed concept will be described with reference to FIG. 16. The present embodiment may also be performed by a computing device. The present embodiment may be performed in a computing device having a lower computing capacity than computational resources required by the learning method described with reference to FIG. 6. For example, it may be performed in a computing device having a lower computing capability than a general purpose computer such as a smart TV, a smart speaker, a set top box, a wall pad, or the like.

Based on packets being collected (S10), a feature set may be generated using the collected packets (S20a). Next, the feature set may be input to the artificial neural network for attack classification deployed in the computing device, and as a result, a value indicating a type of cyber-attack may be output from the artificial neural network for attack classification. As a result, follow-up measures related to the occurrence of the cyber-attack will be performed (S80).

Next, referring to FIG. 17, the configuration of a feature set applied for learning data and result inference in some embodiments of the presently disclosed concept is described. As shown in FIG. 17, the feature set including all the features shown in FIG. 17 includes a total of 46 features. It may be understood that, among them, 'flag,' 'arp_op,' 'icmp_type,' and 'icm_code' may be counted as 9, 3, 7, and 7 features by a one-hot vector, respectively. Hereinafter, with reference to Tables 1 to 2, each feature is described in detail.

Table 1 below shows basic features extracted from each packet.

TABLE 1

| Feature name | Description | Corresponding protocol | Format/size |
| --- | --- | --- | --- |
| protocol_type | Protocol type (TCP/UDP/ICMP/ARP) | Common | 4 or less string |
| tl_data_len | 4-layer data length (−1 if not TCP, UDP, ICMP TCP, UDP, ICMP) | TCP/UDP/ICMP | 4-digit integer |
| flag | TCP control flag ('No Flag' if not TCP) | TCP | 60-character or less string |
| tcp_win_size | TCP window size (−1 if not TCP) | TCP | 5-digit or less integer |
| num_of_frags | a count of fragmented packets | Common | 1-digit integer |
| arp_op | Whether src_ip and dst_ip are equal (different if 0, equal if 1) | Common | 1-digit integer (boolean) |
| icmp_type | Operation of the ARP protocol (−1 if not ARP) | ARP | 1-digit integer |
| icmp_code | ICMP protocol type (−1 if not ICMP) | ICMP | 3-digit or less integer |
| same_sip_pkt_cnt | ICMP protocol code (−1 if not ICMP) | ICMP | 2-digit or less integer |

Among the basic features included in Table 1, 'arp_op' may be a feature for the Man In The Middle (MITM) attack using the ARP spoofing. Due to the nature of the ARP spoofing attack, an ARP packet may be generated and the attack may be detected by using ARP operation information of the generated packet. The 'arp_op' feature may be included in the feature set. In addition, Table 2 below features that represent trends during a reference time (time-based features).

commonly used in Mirai botnets, also affects the feature by increasing an ACK flag proportion more than usual, the four features were included in the feature set.

TABLE 2

| Feature name | Description | Corresponding protocol | Format/size |
| --- | --- | --- | --- |
| same_sip_pkt_cnt | ICMP protocol code (−1 if not ICMP) | ICMP | 2-digit or less integer |
| same_dip_pkt_cnt | Count of packets sent from the same src_ip for the last n seconds | Common | 6-digit or less positive integer |
| same_sip_sport_pkt_cnt | Count of packets received from the same dst_ip for the last n seconds | Common | 6-digit or less positive integer |
| same_dip_dport_pkt_cnt | Count of packets sent from the same src_ip and the same src_port for the last n seconds (−1 if not TCP, UDP) | TCP/UDP | 5-digit or less integer |
| same_sip_pkt_dip_cnt | Count of packets received from the same dst_ip and the same dst_port for the last n seconds (−1 if not TCP, UDP) | TCP/UDP | 5-digit or less integer |
| same_dip_pkt_sip_cnt | Count of dst_ips of packets sent by the same src_ip for the last n seconds | Common | 10-digit or less positive integer |
| same_src_dst_pkt_sport_cnt | Count of src_ips of packets received from the same dst_ip for the last n seconds | Common | 10-digit or less positive integer |
| same_src_dst_pkt_dport_cnt | Count of src_ports of packets sent to the same src_ip and the same dst_ip for the last n seconds | Common | 5-digit or less positive integer |
| same_sip_src_bytes | Count of dst_ports of packets sent to the same src_ip and the same dst_ip in last n seconds | Common | 5-digit or less positive integer |
| same_dip_dst_bytes | Amount of data sent by the same src_ip for the last n seconds (bytes) | Common | 10-digit or less positive integer |
| same_sip_icmp_ratio | Amount of data received from the same dst_ip for the last n seconds (bytes) | Common | 10-digit or less positive integer |
| same_sip_syn_ratio | Proportion of ICMP packets sent from the same src_ip packet for the last n seconds | Common | Real number between 0 and 1 |
| same_dip_icmp_ratio | Proportion of SYN packets sent from the same src_ip for the last n seconds | Common | Real number between 0 and 1 |
| same_dip_syn_ratio | Proportion of ICMP packets among packets received from the same dst_ip for the last n seconds | Common | Real number between 0 and 1 |
| same_sip_syn_ack_diff_cnt | Proportion of SYN packets received from the same dst_ip for the last n seconds | Common | Real number between 0 and 1 |
| same_dip_syn_ack_diff_cnt | Difference between SYN and ACK packets among packets sent from the same src_ip for the last n seconds | Common | 6-digit or less positive integer |

Among the time-based features included in Table 2, 'same_sip_pkt_dip_cnt,' 'same_dip_pkt_sip_cnt,' 'same_src_dst_pkt_sport_cnt,' and 'same_src_dst_pkt_dport_cnt' may be those related to a count of IPs or a count of ports. The 4 features may be features for an attack based on Denial of Service (DoS) and Distributed DoS (DDoS). Considering that since a DDoS attack may be made by transmitting packets that modify a source IP or a destination IP, there may be a large number of unique IPs at a source and a destination of packets delivered in a short time, and there may also be DoS and DDoS attacks with variable port numbers at a source, the 4 features were included in the feature set. Among the time-based features included in Table 2, 'same_sip_syn_ratio,' 'same_dip_syn_ratio,' 'same_sip_syn_ack_diff_cnt,' and 'same_dip_syn_ack_diff_cnt' may be features for the SYN flooding attack. Considering that, in the DoS attack, there may be the SYN flooding attack that attacks with a packet in which an SYN may be set among flags of the TCP protocol, and in this case, a proportion of packets with the SYN flag set due to the nature of DoS attacks should be larger than usual, a count of ACK packets may be larger than that of SYN packets in normal communication situation, ACK flooding, a type Among the features included in Table 1 and 2, 'icmp_type,' 'icmp_code,' 'same_sip_icmp_ratio,' and 'same_dip_icmp_ratio' may all be related to the ICMP protocol and may be used to detect DOS attacks using the ICMP protocol. Considering that an ICMP attack includes ping flooding, ICMP echo flooding, and smurf attacks, in which a flooding attack uses packets of types and codes of the ICMP protocol, and a proportion of ICMP packets increases in the flooding attack through ICMP, the four features were included in the feature set.

The methods according to the embodiments of the presently disclosed concept described so far may be performed by execution of a computer program implemented in computer readable code. The computer program may be transmitted from a first electronic device to a second electronic device through a network such as the Internet and installed in the second electronic device, and thus, may be used in the second electronic device. The first electronic device and the second electronic device include a server device, a physical server belonging to a server pool for cloud services, and a stationary electronic device such as a desktop PC.

Hereinafter, an exemplary computing device 500 that can implement an apparatus and a system, according to various embodiments of the present disclosure will be described with reference to FIG. 18.

Figure 18:
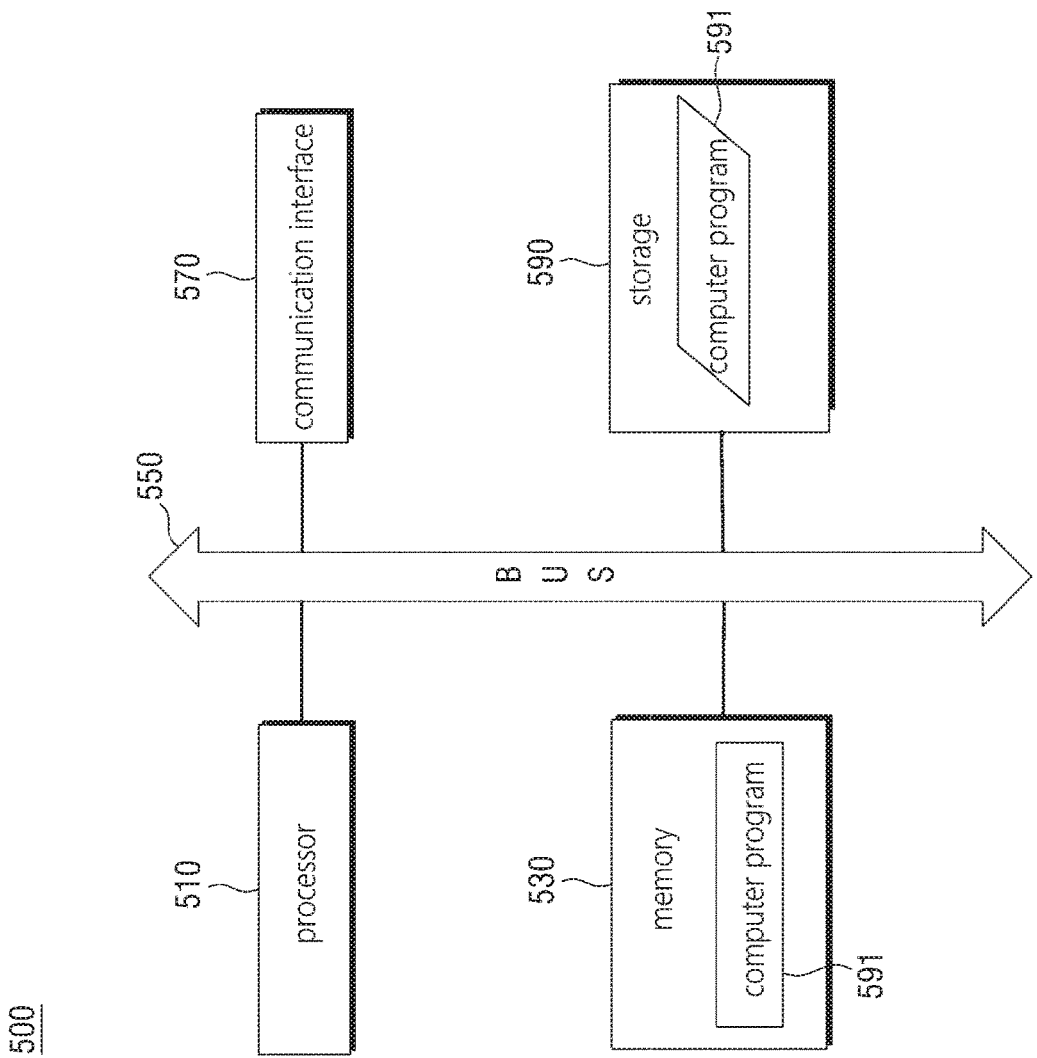
FIG. 18 is a schematic diagram of an exemplary computing device that may implement an apparatus or system according to some embodiments of the presently disclosed concept.

FIG. 18 is an example hardware diagram illustrating a computing device 500.

As shown in FIG. 18, the computing device 500 may include one or more processors 510, a bus 550, a communication interface 570, a memory 530, which loads a computer program 591 executed by the processors 510, and a storage 590 for storing the computer program 591. However, FIG. 18 illustrates the components related to the embodiment of the present disclosure. It will be appreciated by those skilled in the art that the present disclosure may further include other general purpose components in addition to the components shown in FIG. 18.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. For example, based on the computer program 591 being loaded into the memory 530, the logic (or the module) as shown in FIG. 6 may be implemented on the memory 530. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module well known in the art of the present disclosure.

The storage 590 can non-temporarily store one or more computer programs 591. The storage 590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure may be implemented. Based on the computer program 591 being loaded on the memory 530, the processor 510 may perform the methods/operations in accordance with various embodiments of the present disclosure by executing the one or more instructions.

Although the operations may be shown in an order in the drawings, those skilled in the art will appreciate that many variations and modifications can be made to the embodiments without substantially departing from the principles of the presently disclosed technology. The disclosed embodiments of the presently disclosed technology may be used in a generic and descriptive sense and not for purposes of limitation. The scope of protection of the presently disclosed technology should be interpreted by the following claims, and all technical ideas within the scope equivalent thereto should be construed as being included in the scope of the technical idea defined by the present disclosure.

What is claimed is:

1. A method for classifying a cyber-attack, the method being performed in a computing device having an artificial neural network, and comprising:
    obtaining a plurality of features extracted from collected packets; and
    inputting the plurality of features into the artificial neural network and using data output from the artificial neural network to determine a type of cyber-attack indicated by the collected packets,
    wherein the artificial neural network comprises an input layer with a first dimension, an encoder layer with a second dimension smaller than the first dimension to receive a first output value from the input layer, a representation layer with a third dimension smaller than the second dimension to receive a second output value from the encoder layer, and a classifier layer to directly receive a third output value from the representation layer and to output a probability for each class, and
    wherein the plurality of features comprise a count of destination IPs of packets transmitted from the same source IP during a reference time, a count of source IPs of packets transmitted to the same destination IP during the reference time, a count of source ports of packets with the same source IP and the same destination IP during the reference time, and a count of destination ports of packets with the same source IP and the same destination IP during the reference time.

2. The method of claim 1, wherein the collected packets include packets transmitted by an IoT (Internet of Things) device and packets transmitted to the IoT device.

3. The method of claim 1, wherein the plurality of features further comprise a count of packets transmitted from the same source IP during the reference time, a count of packets transmitted to the same destination IP during the reference time, a count of packets transmitted from the same source port of the same source IP during the reference time, and a count of packets transmitted from the same destination port of the same destination IP during the reference time.

4. The method of claim 3, wherein the plurality of features further comprise a count of packets transmitted from the same source port of the same source IP during the reference time, and a count of packets transmitted from the same destination port of the same destination IP during the reference time.

5. The method of claim 1, wherein the plurality of features further comprise a count of fragmented packets.

6. The method of claim 1, wherein the plurality of features further comprise a TCP window size and a data length, wherein the TCP window size is set based on the plurality of features indicating a TCP protocol packet, and wherein the data length is set based on the plurality of features indicating a transport layer packet.

7. The method of claim 1, wherein the plurality of features further comprise a data size transmitted from the same source IP during the reference time, and a data size transmitted to the same destination IP during the reference time.

8. The method of claim 1, wherein the plurality of features further comprise a proportion of SYN packets with an SYN flag set.

9. The method of claim 8, wherein the plurality of features further comprise a difference value between a count of the SYN packets and a count of ACK packets associated with the SYN packets.

10. The method of claim 1, wherein the plurality of features further comprise an ICMP type and an ICMP code.

11. The method of claim 10, wherein the ICMP type is represented by a 7-dimensional one-hot vector, and
wherein the ICMP code is represented by a 7-dimensional one-hot vector.

12. The method of claim 10, wherein the plurality of features further comprise a proportion of ICMP packets from the same source IP during the reference time, and a proportion of ICMP packets from the same destination IP during the reference time.

13. The method of claim 1, wherein the plurality of features further comprise an OP (Opcode) value of an ARP packet.

14. The method of claim 13, wherein the OP (Opcode) value of the ARP packet is represented by a three-dimensional one-hot vector.

15. The method of claim 1, wherein the collected packets include packets transmitted by an IoT (Internet of Things) device and packets transmitted to the IoT device,
wherein the classifier layer outputs a total of 10 class-specific probabilities including 9 IoT device target cyber-attack type classes and 1 normal class, and
wherein the 9 cyber-attack type classes comprise:
a Reconnaissance-Host Discovery class;
a Reconnaissance-Port Scanning class;
a Reconnaissance-OS and Service Detection class;
a MITM (Man In The Middle)-ARP Spoofing Attack class;
a DoS (Denial of Service)-SYN Flooding Attack class;
a Mirai Botnet-DDoS Attack-UDP Flooding Attack class;
a Mirai Botnet-DDoS Attack-HTTP Flooding Attack class;
a Mirai Botnet-DDoS Attack-ACK Flooding Attack class; and
a Mirai Botnet Propagation-Scan & Brute-force class.

16. The method of claim 1, wherein the classifier layer includes nodes that output a probability for each class, wherein an output from each node is an output value from softmax function, and wherein a sum of the outputs from all nodes equal to 1,
wherein the artificial neural network further comprises an output layer, the output layer including one node that receives the probability for each class from the classifier layer and outputs a value indicating the type of cyber-attack.

17. The method of claim 1, wherein the classifier layer outputs a total of 10 class-specific probabilities, including 9 cyber-attack type classes and 1 normal class, and
wherein the representation layer has a dimension of less than 10.

18. An apparatus for classifying a cyber-attack, comprising:
a feature extractor for extracting a plurality of features from collected packets;
an artificial neural network including an input layer with a first dimension, an encoder layer with a second dimension smaller than the first dimension to receive a first output value from the input layer, a representation layer with a third dimension smaller than the second dimension to receive a second output value from the encoder layer, and a classifier layer to directly receive a third output value from the representation layer and to output a probability for each class; and
a cyber-attack classification unit for inputting the plurality of features into the artificial neural network and for using data output from the artificial neural network to determine a type of cyber-attack indicated by the collected packets, and
wherein the plurality of features further comprise a count of destination IPs of packets transmitted from the same source IP during a reference time, a count of source IPs of packets transmitted to the same destination IP during the reference time, a count of source ports of packets with the same source IP and the same destination IP during the reference time, and a count of destination ports of packets with the same source IP and the same destination IP during the reference time.

19. A method for training a model to classify a cyber-attack against an IoT device, the method being performed in a computing device, and comprising:
obtaining a plurality of features extracted from collected packets;
inputting a learning data set comprising the plurality of features into an auto encoder artificial neural network and training the auto encoder artificial neural network in unsupervised learning;
constructing an artificial neural network for attack classification including an input layer, an encoder layer, and a representation layer of the learned auto encoder artificial neural network, and further including a classifier layer that directly receives an output value from the representation layer and outputs a probability for each class; and
training the artificial neural network for attack classification by supervised learning,
wherein the input layer has a first dimension, the encoder layer has a second dimension smaller than the first dimension, and the representation layer has a third dimension smaller than the second dimension.

20. The method of claim 19, wherein the artificial neural network further includes an output layer having one node that receives the probability for each class from the classifier layer and outputs a value indicating a type of cyber-attack, and wherein back-propagation occurs no further than weights between the representation layer and the classifier layer in the training the auto encoder artificial neural network.

* * * * *